US012312860B1

(12) United States Patent
Liang

(10) Patent No.: US 12,312,860 B1
(45) Date of Patent: May 27, 2025

(54) DOOR GUARDRAIL WITHOUT EXPOSED SUPPORT RODS

(71) Applicant: GUANGZHOU PRODIGY DAILY-PRODUCTION CO., LTD, Guangdong (CN)

(72) Inventor: Zhanpeng Liang, Guangdong (CN)

(73) Assignee: GUANGZHOU PRODIGY DAILY-PRODUCTION CO., LTD, Guangzhou (CN)

( * ) Notice: Subject to any disclaimer, the term of this patent is extended or adjusted under 35 U.S.C. 154(b) by 0 days.

(21) Appl. No.: 18/889,326

(22) Filed: Sep. 18, 2024

(30) Foreign Application Priority Data

Jun. 7, 2024 (CN) ........................ 202421305495.4

(51) Int. Cl.

| | |
|---|---|
| ***E06B 9/08*** | (2006.01) |
| ***E06B 9/17*** | (2006.01) |
| ***E06B 9/18*** | (2006.01) |
| *E06B 9/00* | (2006.01) |

(52) U.S. Cl.

CPC ............ *E06B 9/17007* (2013.01); *E06B 9/18* (2013.01); *E06B 2009/002* (2013.01); *E06B 9/08* (2013.01)

(58) Field of Classification Search

CPC .. E06B 2009/002; E06B 9/18; E06B 9/17007; E06B 9/17; E06B 9/78; E06B 9/60; E06B 9/08; E06B 9/13; E06B 9/56; E06B 9/50; E06B 2009/543

See application file for complete search history.

(56) References Cited

U.S. PATENT DOCUMENTS

| | | | | |
|---|---|---|---|---|
| 6,536,502 B2 * | 3/2003 | Britto | E06B 9/08 160/293.1 |
| 7,219,709 B1 * | 5/2007 | Williams | E01F 13/028 160/24 |
| 9,598,896 B1 * | 3/2017 | Pichik | E06B 9/13 |
| 11,359,432 B2 * | 6/2022 | Wang | E06B 3/80 |
| 2008/0121354 A1 * | 5/2008 | Cheng | E01F 13/028 160/290.1 |
| 2015/0376942 A1 * | 12/2015 | Henderson | E06B 9/08 160/192 |
| 2017/0284154 A1 * | 10/2017 | Reiner | E06B 9/78 |
| 2021/0355751 A1 * | 11/2021 | Liang | E06B 9/60 |
| 2022/0162905 A1 * | 5/2022 | Huang | E06B 9/13 |
| 2023/0151643 A1 * | 5/2023 | Huang | E05B 65/0014 160/304.1 |

* cited by examiner

*Primary Examiner* — Johnnie A. Shablack
*Assistant Examiner* — Jeremy C Ramsey
(74) *Attorney, Agent, or Firm* — Hemisphere Law, PLLC; Zhigang Ma

(57) ABSTRACT

A door guardrail without exposed support rods, comprising a fabric winding tube and a handlebar arranged on an outer side of the fabric winding tube, a mesh fabric being arranged between the fabric winding tube and the handlebar, a support rod is arranged in the fabric winding tube, a spring device allowing the mesh fabric to retract automatically after being pulled out is disposed around the support rod, a lock device used for controlling a length of the mesh fabric pulled out is arranged at an end of the support rod. The support rod is arranged in the fabric winding tube, and the spring device is disposed around the support rod to allow the mesh fabric to retract automatically after being pulled out, such that the storage size of the door guardrail can be strictly controlled, thus effectively controlling packaging and transportation costs.

6 Claims, 7 Drawing Sheets

DOOR GUARDRAIL WITHOUT EXPOSED SUPPORT RODS

BACKGROUND OF THE INVENTION

Technical Field

The invention belongs to the field of door guardrail design, and more particularly relates to a door guardrail without exposed support rods.

Description of Related Art

Most door guardrails on the present market are formed by a rotary rod, a partition fabric and fixing seats and are household tools used for dividing an indoor or outdoor space into different temporary activity spaces. The door guardrail is used as follows: users pull the mesh fabric from the rotary rod by a certain length and then fix the pulled-out end of the mesh fabric, the mesh fabric pushed out is kept in a tensioned state under the action of the force of a spring, and at this moment, the mesh fabric functions as a partition screen to realize a space partition effect.

However, the overall size of existing door guardrails on the market cannot be further reduced, leading to high packaging and transportation costs.

BRIEF SUMMARY OF THE INVENTION

The main purpose of the invention is to provide a door guardrail without exposed support rods, the overall size of which can be controlled to further effectively control packaging and transportation costs.

The main objective of the invention is to provide a door guardrail without exposed support rods, comprising a fabric winding tube and a handlebar arranged on an outer side of the fabric winding tube, a mesh fabric being arranged between the fabric winding tube and the handlebar, a support rod is arranged in the fabric winding tube, a spring device allowing the mesh fabric to retract automatically after being pulled out is disposed around the support rod, a lock device used for controlling a length of the mesh fabric pulled out is arranged at an end of the support rod, the lock device comprises a tooth portion clamped on the fabric winding tube and a swing rod in snap fit with the tooth portion, a press part is arranged above the swing rod and is pushed to drive the swing rod to be separated from the tooth portion, a first return spring is arranged between the press part and the swing rod, a second return spring is arranged on a side face perpendicular to the swing rod, and the swing rod is in snap fit with the tooth portion under the action of the second return spring.

A door guardrail without exposed support rods, a shell and a base are arranged at two ends of the fabric winding tube respectively, the lock device is located in the shell, the shell comprises an upper portion and a lower portion threadedly connected to the upper portion, a first protrusion used for pushing the swing rod is arranged on a lower end surface of the press part, and the upper portion is provided with a groove allowing the press part to reciprocate therein.

A door guardrail without exposed support rods, the spring device comprises a fabric winding spring disposed around the support rod and an inner fastener and a lower fastener which are arranged at upper and lower ends of the fabric winding spring respectively, the inner fastener is clamped on the fabric winding tube, and the lower fastener is fixedly connected to the support rod.

A door guardrail without exposed support rods, hook portions are parallelly arranged on the lower end surface of the press part, and holes are formed in positions, corresponding to the hook portions, of a bottom surface of the groove respectively.

A door guardrail without exposed support rods, the swing rod has an end hinged to the lower portion and an end provided with a second protrusion in snap fit with the tooth portion.

A door guardrail without exposed support rods, at least two anti-rotation bulges connected to the tooth portion in a meshing manner are arranged below the second protrusion at intervals.

A door guardrail without exposed support rods, a first connecting rod connected to a side of the mesh fabric is arranged on an outer side of the handlebar, and a second connecting rod connected to another side of the mech fabric is arranged on an outer side of the support rod.

A door guardrail without exposed support rods, a first mounting base and a second mounting base are arranged at upper and lower ends of the handlebar respectively, two ends of the first connecting rod are fixedly connected to the first mounting base and the second mounting base respectively, and the second connecting rod is located in the fabric winding tube.

A door guardrail without exposed support rods, adjusting slots are formed in a joint of the first mounting base and the handlebar and a joint of the second mounting base and the handlebar respectively.

A door guardrail without exposed support rods, a slip aid pad is arranged on an upper end surface of the tooth portion, and a spring slip pad is arranged between the press part and the swing rod and located above the slip aid pad.

One of the above-mentioned technical solutions of the invention has at least one of the following advantages or beneficial effects:

In the invention, the support rod is arranged in the fabric winding tube, and the spring device is disposed around the support rod to allow the mesh fabric to retract automatically after being pulled out, such that the storage size of the door guardrail can be strictly controlled, thus effectively controlling packaging and transportation costs.

BRIEF DESCRIPTION OF THE SEVERAL VIEWS OF THE DRAWINGS

The invention is further described below in conjunction with accompanying drawings and embodiments.

DETAILED DESCRIPTION OF THE INVENTION

Several different embodiments or examples are provided below to implement different solutions of the invention.

Figure 1:
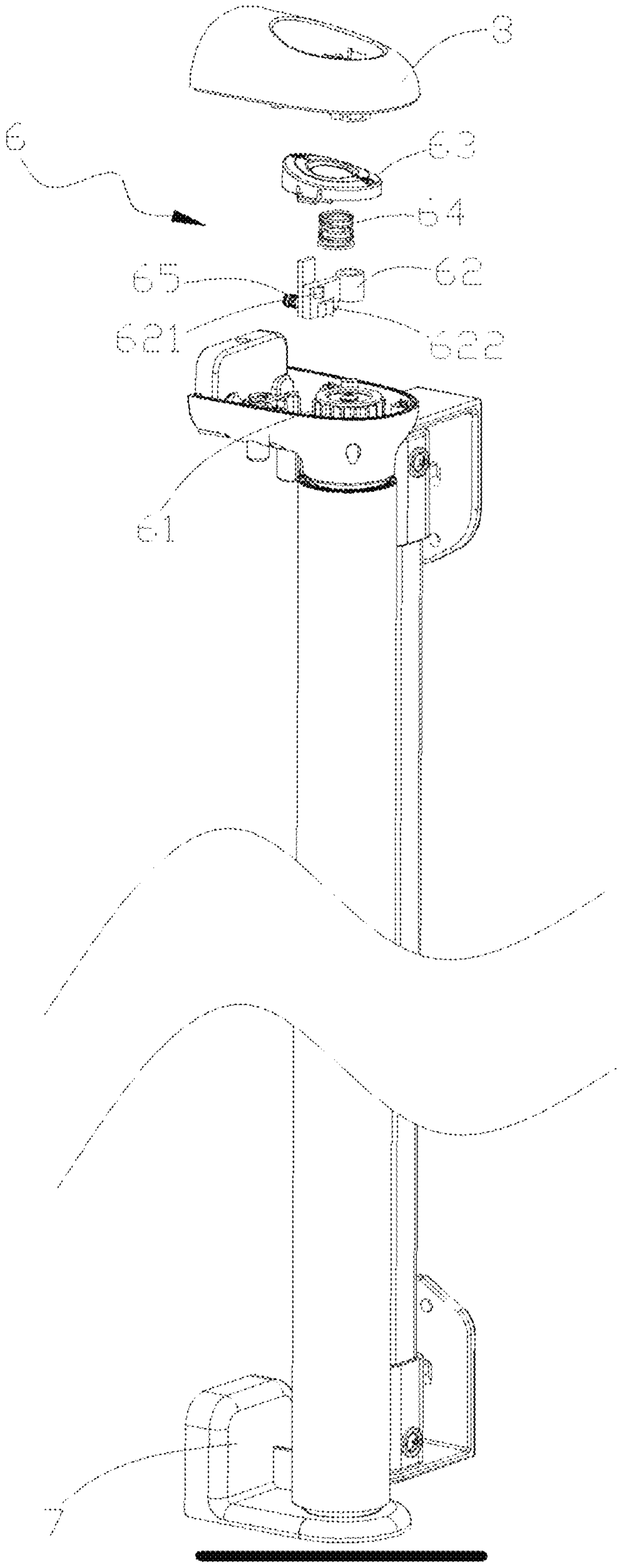
FIG. 1 is an overall structural view according to one embodiment of the invention.
Figure 2:
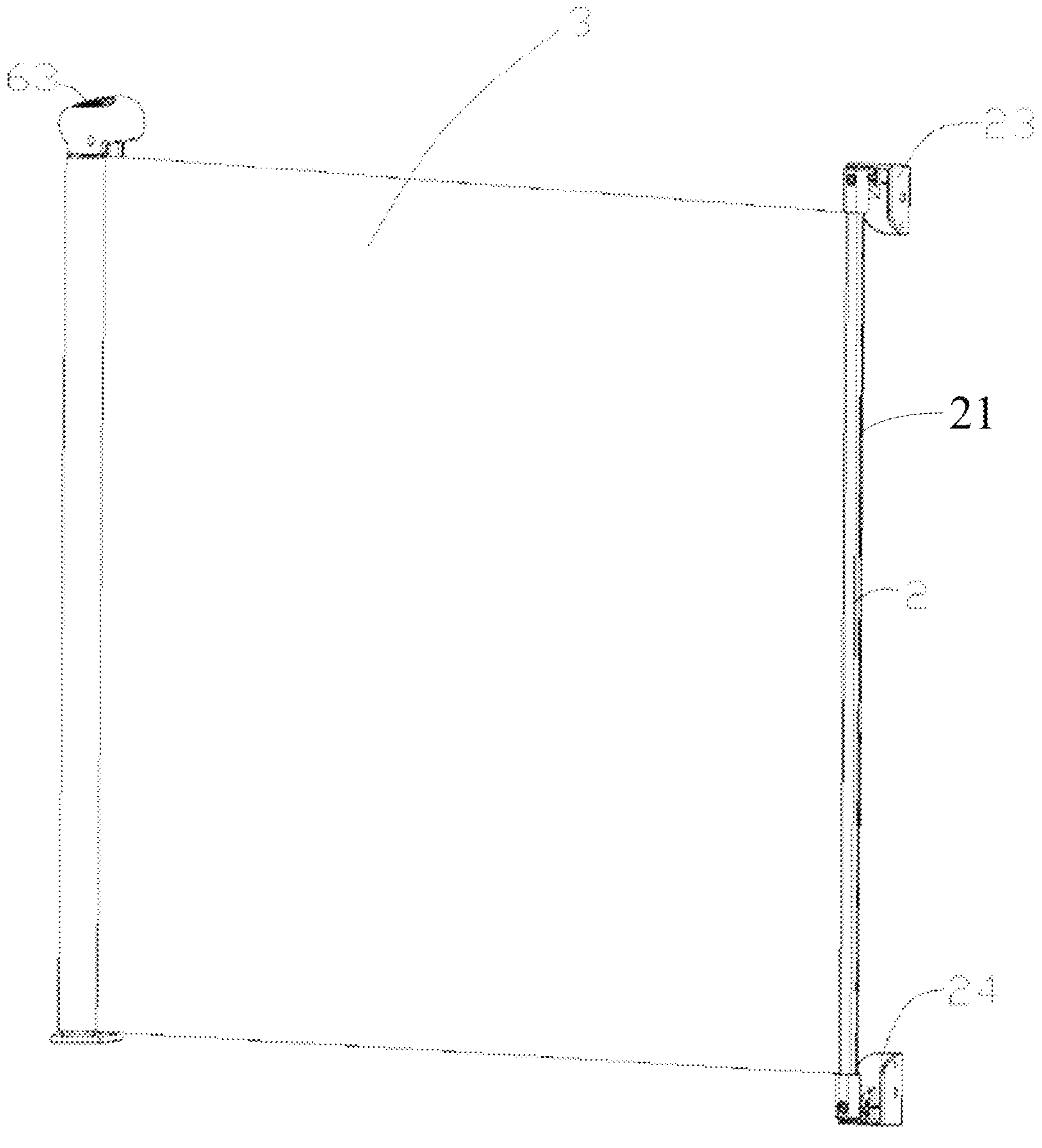
FIG. 2 is an unfolded view according to one embodiment of the invention.
Figure 3:
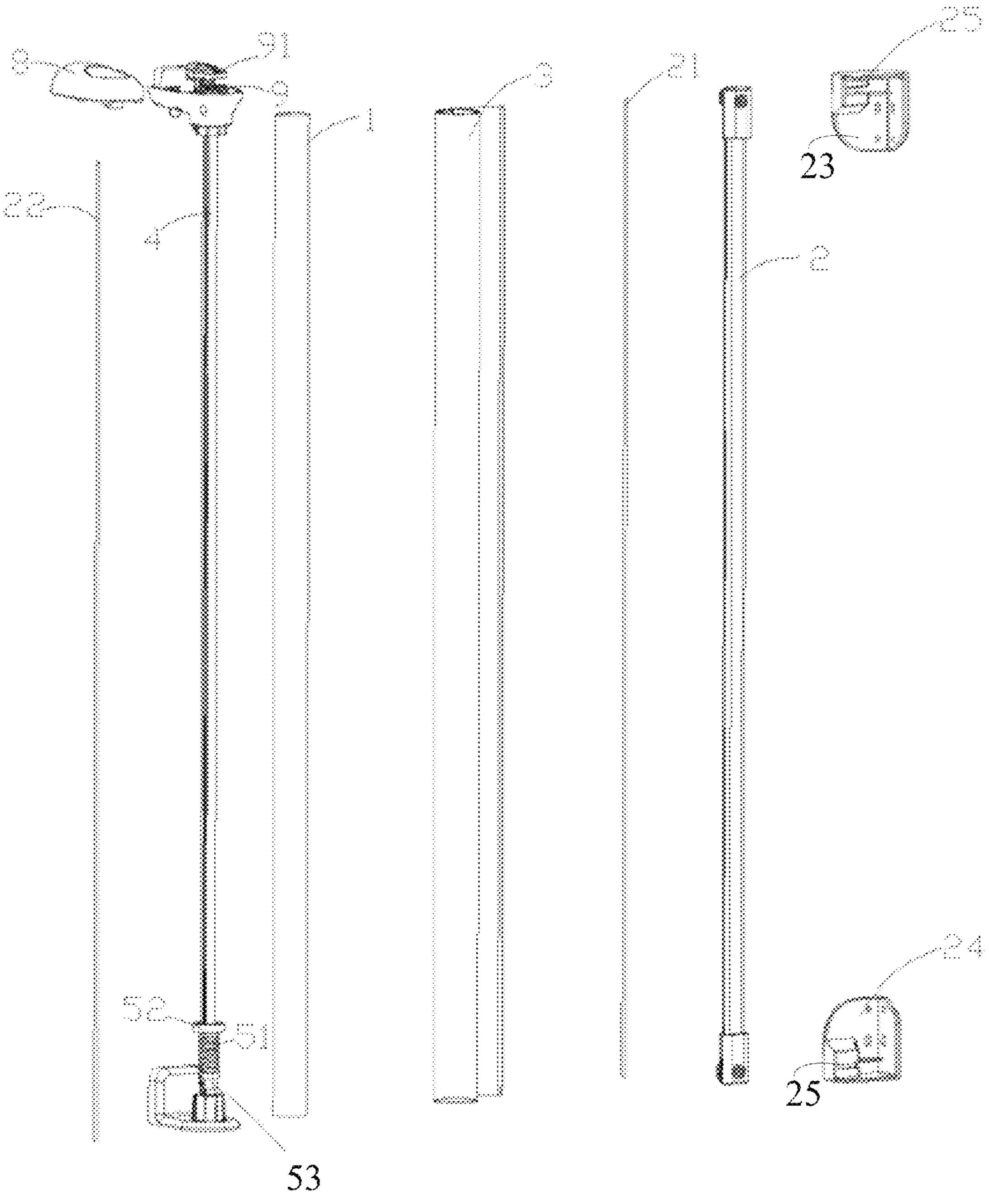
FIG. 3 is an exploded view according to one embodiment of the invention.
Figure 4:
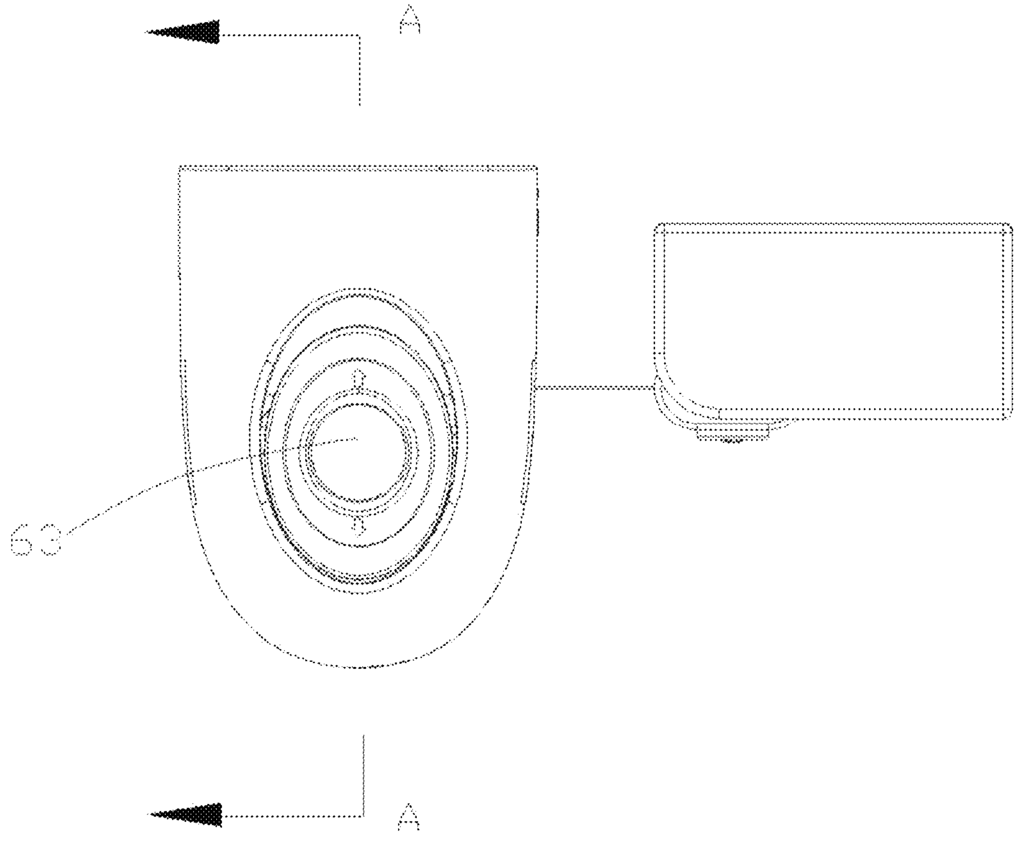
FIG. 4 is a top view according to one embodiment of the invention.
Figure 5:
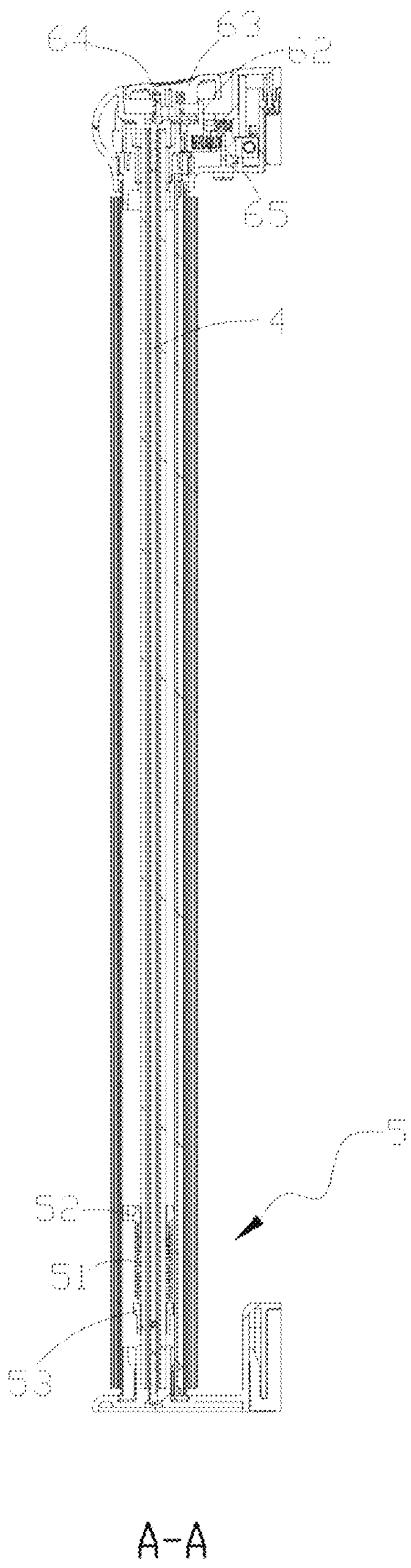
FIG. 5 is a sectional view along A-A according to one embodiment of the invention.
Figure 6:
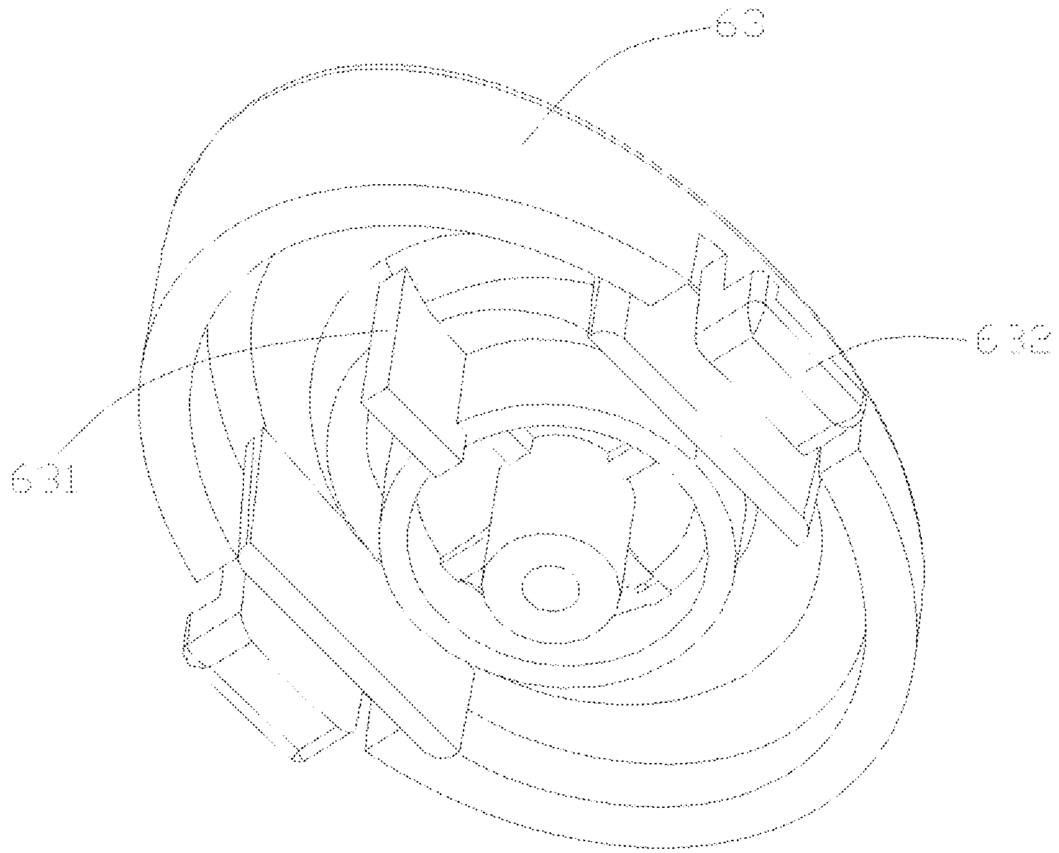
FIG. 6 is a bottom view of a press part according to one embodiment of the invention.
Figure 7:
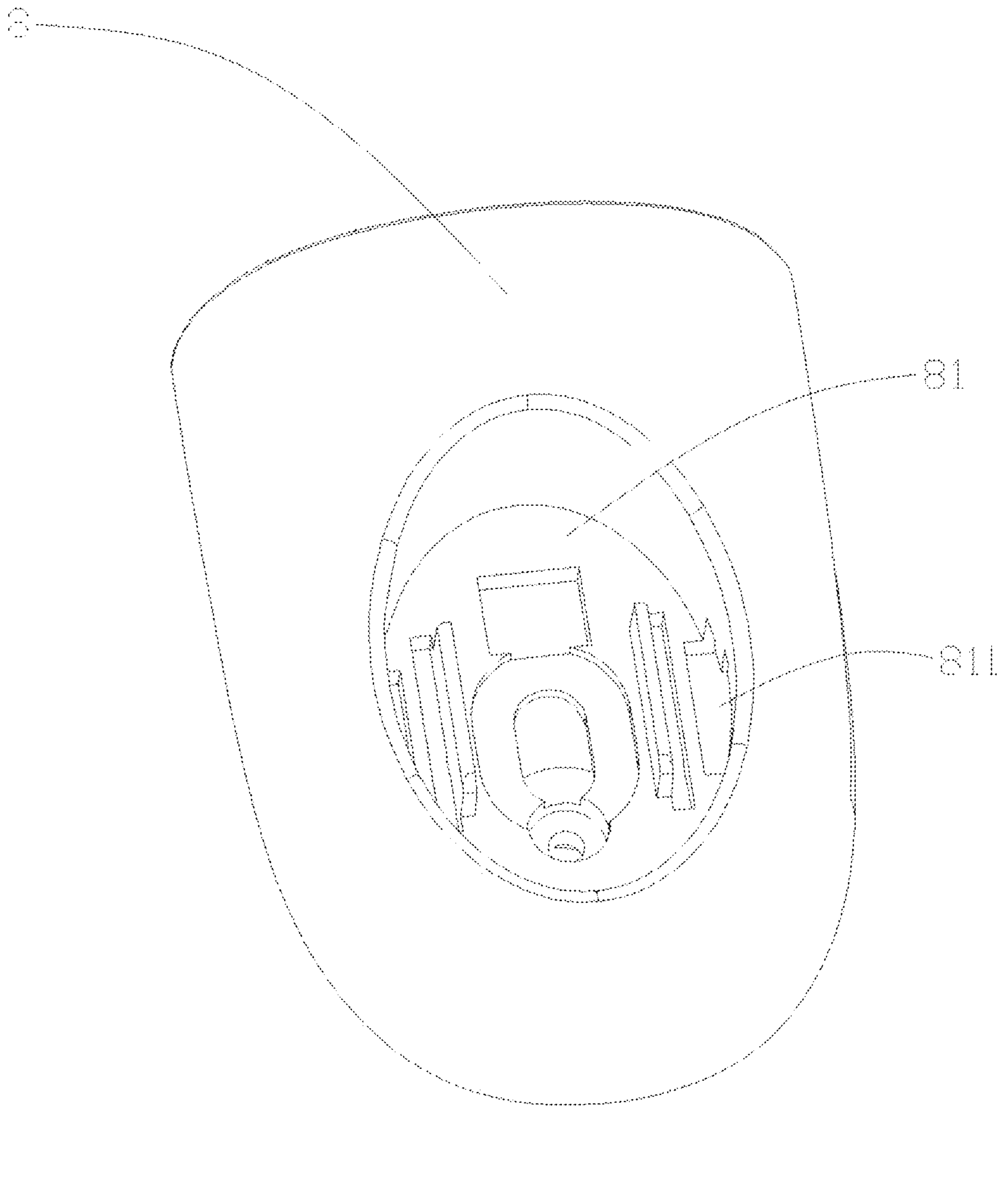
FIG. 7 is a top structural view according to one embodiment of the invention.

Referring to FIGS. 1-7, a door guardrail without exposed support rods comprises a fabric winding tube 1, a handlebar 2 arranged on an outer side of the fabric winding tube 1, a mesh fabric 3 arranged between the fabric winding tube 1 and the handlebar 2, a spring device 5 allowing the mesh fabric 3 to retract automatically after being pulled out, and a lock device 6 used for controlling the length of the mesh fabric 3 pulled out. In one embodiment of the invention, a support rod 4 is arranged in the fabric winding tube 1, the spring device 5 is disposed around the support rod 4 and comprises a fabric winding spring 51 disposed around the support rod 4 and an inner fastener 52 and a lower fastener 53 which are arranged at upper and lower ends of the fabric winding spring 51 respectively, the inner fastener 52 is clamped on the fabric winding tube 1, and the lower fastener 53 is fixedly connected to the support rod 4; when the mesh fabric 3 is pulled out, the inner fastener 52 rotates with the fabric winding tube 1, such that the fabric winding tube 51 is compressed; and when the lock device 6 is unlocked, the mesh fabric 3 will be retracted under the action of the fabric winding spring 51. In this way, the storage size of the door guardrail without exposed support rods can be strictly controlled, thus further reducing packaging and transportation costs.

In one embodiment of the invention, the lock device 6 is arranged at one end of the support rod 4 and comprises a tooth portion 61 clamped on the fabric winding tube 1 and a swing rod 62 in snap fit with the tooth portion 61, a press part 63 is arranged above the swing rod 62, and a first protrusion 631 used for pushing the swing rod 62 is arranged on a lower end surface of the press part 63. The press part 63 can be pushed to separate the swing rod 62 from the tooth portion 61 to unlock the lock device 6, and then the mesh fabric 3 can be pulled to a suitable position to be fixed.

In one embodiment of the invention, a first return spring 64 for driving the press part 63 to return automatically after being pressed is arranged between the press part 63 and the swing rod 62, and a second return spring 65 is arranged on a side face perpendicular to the swing rod 62. When the press part 63 returns to the initial position, the swing rod 62 comes in snap fit with the tooth portion 61 again under the action of the second return spring 65 to lock the lock device 6.

In one embodiment of the invention, a shell and a base 7 are arranged at two ends of the fabric winding tube 1 respectively, the lock device 6 is located in the shell, the shell comprises an upper portion 8 and a lower portion threadedly connected to the upper portion, the upper portion 8 is provided with a groove 81 allowing the press part 63 to reciprocate therein, and the press part 63 slides in the groove 81 to lock or unlock the lock device 6.

In one embodiment of the invention, one end of the swing rod 62 is hinged to the lower portion, the other end of the swing rod 62 is provided with a second protrusion 621 in snap fit with the tooth portion 61, and two anti-rotation bulges 622 connected to the tooth portion 61 in a meshing manner are arranged below the second protrusion 621 at intervals, such that the stability of the lock device 6 in the locked state can be improved to prevent the second protrusion 621 against accidental fracture.

In one embodiment of the invention, two hook portions 632 are parallelly arranged on the lower end surface of the press part 63 and located on two sides of the first protrusion 631 respectively, and holes 811 are formed in positions, corresponding to the two hook portions 632, of a bottom surface of the groove 81 respectively. In this way, after the press part 63 is pressed, the two hook portions 632 respectively penetrate through the holes 811 to push the swing rod 62 to be separated from the tooth portion 61.

In one embodiment of the invention, a first connecting rod 21 connected to one side of the mesh fabric 3 is arranged on an outer side of the handlebar 2, a second connecting rod 22 connected to the other side of the mech fabric 3 is arranged on an outer side of the support rod 4, the second connecting rod 22 is disposed in the fabric winding tube 1, and the first connecting rod 21 and the second connecting rod 22 are all stainless steel components.

In one embodiment of the invention, a first mounting base 23 and a second mounting base 24 are arranged at upper and lower ends of the handlebar 2 respectively, two ends of the first connecting rod 21 are fixedly connected to the first mounting base 23 and the second mounting base 24 respectively, and adjusting slots 25 are formed in a joint of the first mounting base 23 and the handlebar 2 and a joint of the second mounting base 24 and the handlebar 2 respectively to facilitate the installation of the handlebar 2.

In one embodiment of the invention, a slip aid pad 9 is arranged on an upper end surface of the tooth portion 61, a spring slip pad 91 is arranged between the press part 63 and the swing rod 62 and located above the slip aid pad 9, and the first return spring 64 is disposed around the spring slip pad 91.

What is claimed is:

1. A door guardrail, comprising:

a fabric winding tube (1) and a handlebar (2) arranged on an outer side of the fabric winding tube (1), a mesh fabric (3) being arranged between the fabric winding tube (1) and the handlebar (2), wherein a support rod (4) is arranged in the fabric winding tube (1), a spring device (5) allowing the mesh fabric (3) to retract automatically after being pulled out is disposed around the support rod (4), a lock device (6) used for controlling a length of the mesh fabric (3) pulled out is arranged at an end of the support rod (4), the lock device (6) comprises a tooth portion (61) clamped on the fabric winding tube (1) and a swing rod (62) in snap fit with the tooth portion (61), a press part (63) is arranged above the swing rod (62) and is pushed to drive the swing rod (62) to be separated from the tooth portion (61), a first return spring (64) is arranged between the press part (63) and the swing rod (62), a second return spring (65) is arranged on a side face perpendicular to the swing rod (62), and the swing rod (62) is in snap fit with the tooth portion (61) under the action of the second return spring (65);

wherein a shell is arranged at one end of the fabric winding tube (1), the lock device (6) is located in the shell, the shell comprises an upper portion (8) and a lower portion connected to the upper portion, and the upper portion (8) is provided with a groove (81) allowing the press part (63) to reciprocate therein;

a first protrusion (631) used for pushing the swing rod (62) is arranged on a lower end surface of the press part (63), two hook portions (632) protrudes downwards in parallel from the lower end surface of the press part (63) and arranged at two opposite sides of the first protrusion (631), and holes (811) are formed in positions, corresponding to the hook portions (632), of a bottom surface of the groove (81) respectively, the hook portions (632) are configured to pass downwards through the holes (811); and the swing rod (62) has an end hinged to the lower portion and an end provided with a second protrusion (621) in snap fit with the tooth portion (61); and at least two anti-rotation bulges (622) connected to the tooth portion (61) in a meshing manner are arranged below the second protrusion (621) at intervals.

2. The door guardrail according to claim 1, wherein a base (7) is arranged at another end of the fabric winding tube (1).

3. The door guardrail according to claim 2, wherein the spring device (5) comprises a fabric winding spring (51) disposed around the support rod (4) and an inner fastener (52) and a lower fastener (53) which are arranged at upper and lower ends of the fabric winding spring (51) respectively, the inner fastener (52) is clamped on the fabric winding tube (1), and the lower fastener (53) is fixedly connected to the support rod (4).

4. The door guardrail according to claim 1, wherein a first connecting rod (21) connected to a side of the mesh fabric (3) is arranged on an outer side of the handlebar (2), and a second connecting rod (22) connected to another side of the mesh fabric (3) is arranged on an outer side of the support rod (4).

5. The door guardrail according to claim 4, wherein a first mounting base (23) and a second mounting base (24) are arranged at upper and lower ends of the handlebar (2) respectively, two ends of the first connecting rod (21) are fixedly connected to the first mounting base (23) and the second mounting base (24) respectively, and the second connecting rod (22) is located in the fabric winding tube (1).

6. The door guardrail according to claim 5, wherein adjusting slots (25) are formed in a joint of the first mounting base (23) and the handle bar (2) and a joint of the second mounting base (24) and the handlebar (2) respectively.

* * * * *